June 9, 1959  E. E. ROBERTS ET AL  2,889,578
PRESS FOR CONSOLIDATION OF MATERIAL UNDER PRESSURE
Filed June 21, 1956  2 Sheets-Sheet 1

INVENTORS
E. E. ROBERTS
C. A. SHOPE
BY Hudson & Young
ATTORNEYS

INVENTORS
E. E. ROBERTS
C. A. SHOPE
BY Hudson & Young
ATTORNEYS

United States Patent Office 2,889,578
Patented June 9, 1959

2,889,578
PRESS FOR CONSOLIDATION OF MATERIAL UNDER PRESSURE

Ernest E. Roberts and Claude A. Shope, McGregor, Tex., assignors to Phillips Petroleum Company, a corporation of Delaware Application June 21, 1956, Serial No. 592,871

1 Claim. (Cl. 18—16)

This invention relates to apparatus for consolidating compressible material in a mold. In particular, it relates to apparatus for consolidating compressible material in an excess pressure release sub-assembly commonly used in rocket projectiles, for example, in jet-assisted-take-off rocket motors.

In the art of rocket projectiles, it is common practice to provide the combustion chamber or rocket motor of the projectile with an excess pressure relief mechanism. Since the pressure generated in the combustion chamber of a rocket motor must be rigidly controlled for optimum efficiency, it is necessary to provide safety means for relieving or venting and pressure generated in the rocket motor which exceeds a predetermined pressure. The excess pressure relief assemblies commonly used for this purpose comprise one or more housings secured to the casing of the rocket motor and in communication with the combustion chamber. A small disk is placed in the housing in such a manner that the disk will be ruptured or will fail when the predetermined pressure is exceeded. In jet-assisted-take-off rocket motors charged with a solid propellant, such as a propellant made of an oxidizer and a binder, the disks in the excess pressure release sub-assemblies are designed to rupture for example at 1850 to 2000 p.s.i. Upon rupture of the disks, the excess pressure in the combustion chamber is released through the resulting opening or throat in addition to being released through the normally open nozzle of the rocket motor. These disks are very thin and can be made of Inconel or similar metal. The disks are normally separated from the combustion chamber by a suitable low temperature compound which functions as insulation in order to prevent damage to the disks by the hot combustion gases normally generated in the combustion chambers during firing of the rocket motor. The excess pressure release sub-assemblies are made by packing or consolidating the low temperature compound therein. In order to operate effectively, the disks cannot be bolted or otherwise rigidly secured to the housing of the subassembly but, rather, the disks are so secured that they may be easily displaced or ruptured. It is common to effect the attachment of the disks to the housing by crimping the disks in the subassembly housings. Because the disks are easily displaceable, it is very difficult to pack the low temperature compound in the subassembly without displacing the disk due to the pressure applied in compressing the low temperature compound. If too much pressure is applied to the low temperature compound during assembly of the excess pressure relief mechanism, the disks will be displaced or otherwise ruptured.

Accordingly, an object of this invention is to provide apparatus for consolidating compressible material in a mold or the like.

Another object is to provide apparatus for consolidating a low temperature compound or other insulating material in an excess pressure relief mechanism, such as the type commonly used in rocket motors, without rupturing or otherwise displacing the disks in these assemblies due to the application of an excess pressure.

Other objects and advantages of this invention will become apparent, to those skilled in the art, from the following description, appended claim and drawings:

Broadly contemplated, operation of the apparatus of this invention comprises filling an open end mold with a volume of compressible material in excess of that finally desired, applying a predetermined pressure to said material at a controlled rate, and removing or extruding the excess of said material in said mold as pressure is applied thereto. This invention is particularly applicable for compressing a low temperature compound or other insulation material commonly used in an excess pressure relief mechanism such as the type commonly used in jet-assisted-take-off rocket motors and our invention is described herein as applied thereto. However, it is to be understood that our invention is not to be unduly limited thereto but can be employed for filling or compressing any compressible material in a mold where only a predetermined pressure can safely be applied.

Figure 1:
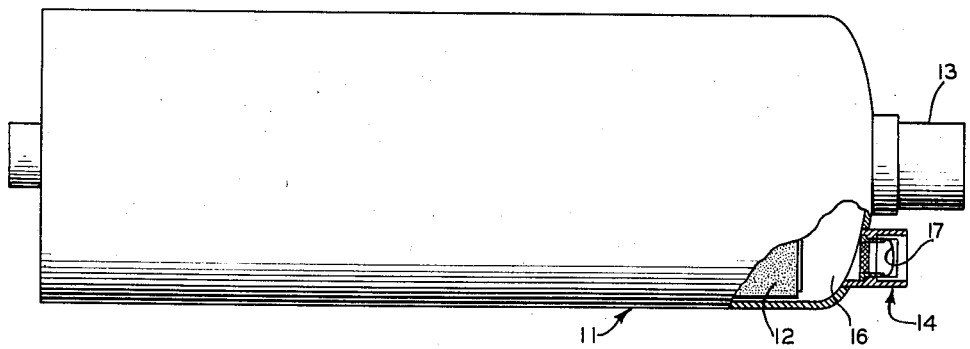
Figure 1 is an elevational view of a rocket motor with a portion of the casing of the same broken away to show the position of an excess pressure relief mechanism.

Referring to the drawing now, wherein like reference numbers refer to like parts throughout the drawing, and to Figure 1 in particular, a rocket motor generally designated 11 is charged with a solid rocket propellant 12 and provided at its aft end with a nozzle 13. Rocket motors of this type are well known in the art of rocketry and need not be detailed here. Rocket motor 11 is provided at its aft end with an excess pressure relief mechanism generally designated 14, which is in communication with the combustion chamber 16 of the rocket motor 11. The pressure and gases generated by the combustion of the rocket propellant 12 are normally released from the combustion chamber 16 through the nozzle 13; however, if for some reason the pressure in the combustion chamber should exceed a predetermined pressure, the disk 17 in the excess pressure relief mechanism 14 is ruptured or otherwise displaced and excess pressure in the combustion chamber is released through the opening or throat now provided by the excess pressure relief mechanism 14, in addition to the normal release through the nozzle 13.

Figure 2:
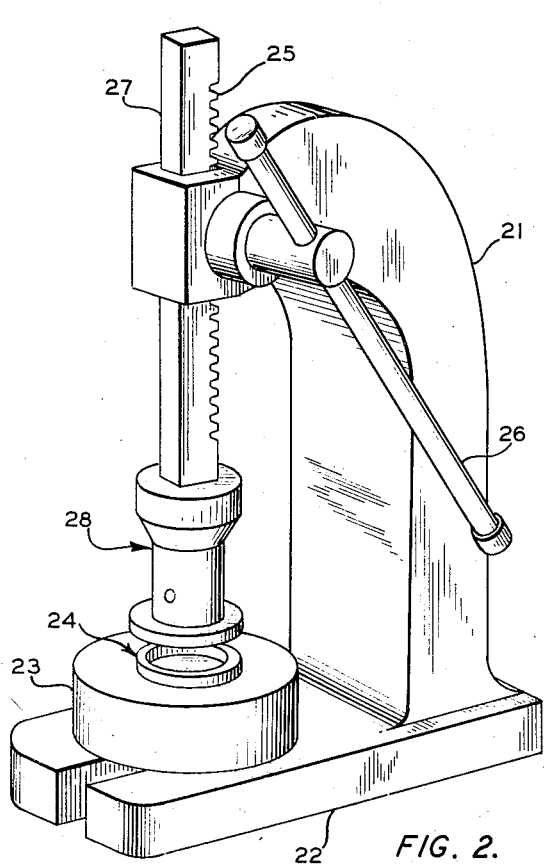
Figure 2 is an isometric view of a conventional arbor press modified according to this invention.
Figure 3:
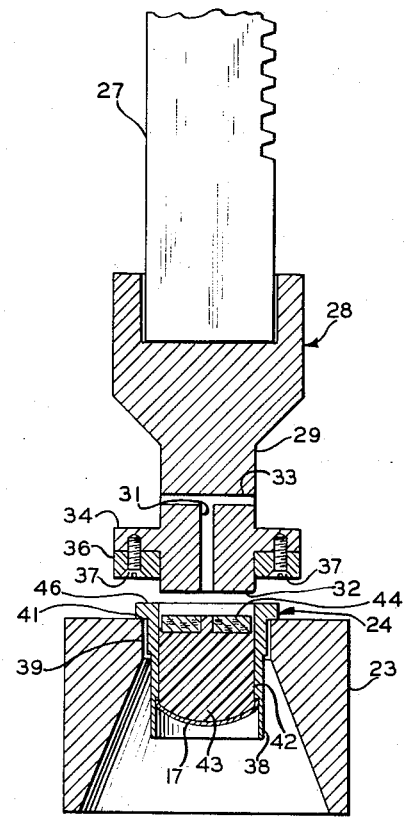
Figure 3 is an elevational view in cross-section, of an enlarged portion of Figure 2, showing one embodiment of the invention.

Referring to Figure 2, a conventional hand press is shown, such as the arbor type, modified according to this invention. The press comprises a frame 21 having a flat portion 22 which serves as a base or table upon which is placed a support block 23 which supports an open end mold 24 such as that used in the above-mentioned excess pressure relief mechanism. The press is provided with a lever 26 which can be operated by hand to vertically reciprocate in a manner well known a ram 27 having teeth 25. The lower end of the ram 27 is provided with a plunger generally designated 28 which is shown in Figure 3 in detail. The plunger 28 is threaded to the lower end of the ram 27 or can be secured by any other suitable means thereto. The lower portion of the plunger 28 is reduced in size and forms the head 29 of the plunger 28. It is evident that reciprocation of the ram 27 correspondingly results in the vertical reciprocation of the plunger 28. The head 29 is in the shape of a solid cylinder which is provided with a small axial bore or passage 31 with one end opening in the lower face 32 of the head 29. A second bore or passage 33 transverses the head 29 and intersects the first passage 31 at its upper end. The head 29 has an intermediate enlarged annular portion 34 and a replaceable washer 36 is attached to the lower face of the annular portion 34 by means of screws 37 or the like. The lower face of the washer 36 is removed a predetermined distance from the lower face 32 of the head 29.

The mold 24 comprises a cylindrical sleeve 38, the upper end of which has an outside diameter greater than the diameter of the opening 39 provided in the top of the support block 23. The mold 24 is supported on block 23 by reason of its shoulder 41 and the mold protrudes a small distance upwardly from the block 23. The mold 24 is provided with a mold cavity 42 which is defined by the inside wall of the sleeve 38 and a disk 17 which is crimped or otherwise suitably secured to the inside of the sleeve 38. The mold cavity 42 is cylindrical in shape and has a diameter which is slightly larger than the diameter of the lower face 32 of head 29, in order that a substantially air tight fit is provided when the head 29 is moved downwardly in the mold cavity 42. As shown in Figure 3, the mold cavity is filled with the desired amount of compressible material 43, the top surface of which is provided with a cork ring 44 or a washer of similar material. The compressible material 43 is shown in its final shape after compression. This material can be finely divided powder, a viscous plastic, or any other compressible material. The distance between the top surface of the cork ring 44 and the top face 46 of the sleeve 38 is substantially the same as the distance between the lower face of washer 36 and the lower face 32 of the head 29. The opening at the bottom of the support block 23 is greater in diameter than the opening 39 at the top of the block to facilitate the placing and removal of the sleeve 38.

Figure 4:
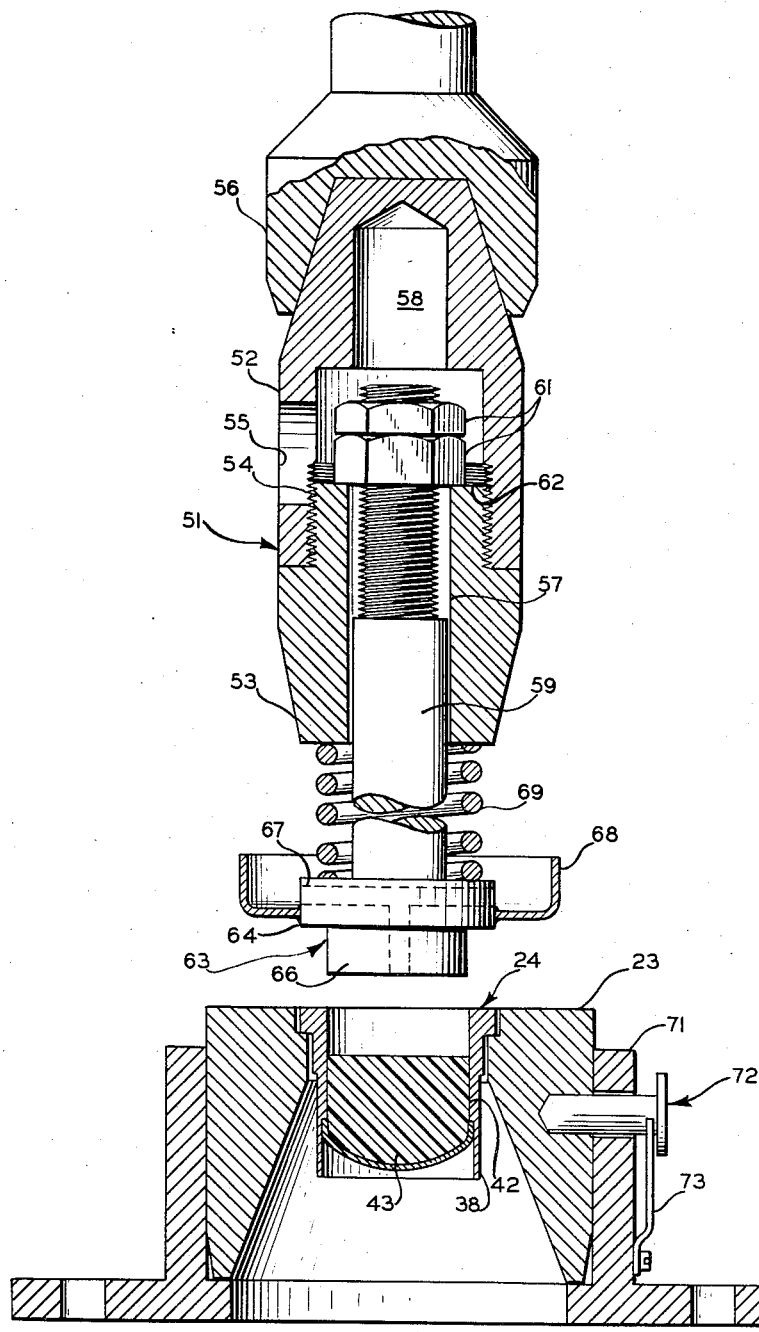
Figure 4 is an elevational view in partial cross-section illustrating a second embodiment of this invention.

Referring now to Figure 4, in which a second embodiment of our invention is illustrated, an anvil generally designated 51 is provided with upper and lower members 52 and 53 respectively, which can be threaded together at 54. The upper member 52 of the anvil 51 is secured by any suitable means to the ram 56 of a suitable press, such as that shown in Figure 2. The lower anvil member 53 is provided with a central bore 57 and the upper anvil member 52 is provided with a hollow 58. A plunger generally designated 59 is reciprocally positioned in bore 57 and the upper end of the plunger 59 extends into the hollow 58. The upper portion of plunger 59 is threaded and nuts 61 are threaded thereto. The nuts 61 are so fixed that they normally rest upon a shoulder 62 which forms the upper end of the lower anvil member 53. The anvil 51 has an opening 55 through which the nuts 61 and shoulder 62 are visible. The lower end of the plunger 59 extends beneath the lower anvil member 53 and is enlarged at its lower end to form a head generally designated 63. The head 63 comprises an enlarged annular portion 64 and passages 66 and 67 are provided in head 63 in a manner similar to that shown in Figure 3. A pan 68 is secured to the annular portion 67 and surrounds the same so as to catch or receive excess material extruded through passages 66 and 67 in a manner to be set forth in detail hereinafter. A compression spring 69 surrounds a portion of the plunger 59 which protrudes from the lower end of the anvil 51; the lower end of the spring 69 abuts the upper face of annular portion 64 and the upper end of the spring 69 abuts the lower face of anvil member 53. The support block 23 for the mold 24 is similar to that shown in Figure 3, but in addition this block 23 is positioned in a suitable base member 71 and is held therein by means of a removable pin 72 which extends into the side of base member 71 and block 23. The pin 72 is held in place by means of a pivotal latch 73.

The following is a brief discussion of the mode of operation of my invention. With reference to the embodiment shown in Figures 2 and 3, a volume of compressible material 43 in excess to that finally desired is charged in the mold cavity 42 of the mold 24. The cork ring 44 is placed on top of the compressible material 43 to aid in the compression of the material 43. The plunger 23 is moved downwardly by reason of the action of ram 27 by the hand lever 26. The head 29 is moved into the mold cavity 42 and as pressure is applied the excess compressible material is extruded through passages 31 and 33. As mentioned hereinbefore, the application of pressure in excess of a predetermined pressure will tend to rupture or otherwise displace the disk 17. Therefore, to obviate this occurrence, the downward travel of the head 29 is limited by reason of the lower face of the washer 36 contacting the upper face 46 of the sleeve 38. This insures that a predetermined volume of compressible material will be compressed in the mold cavity. At the completion of the downward travel of head 29 into the cavity 42 of the mold 24, the plunger 29 is moved upwardly by action of the lever 26 and the head 29 removed from the mold cavity 42.

Referring now to the embodiment of our invention shown in Figure 4, downward movement of the ram 56 correspondingly results in the downward movement of anvil 51 and plunger 59. The compression of the spring 69 will not undergo further compression until the lower face of the head 63 enters the mold cavity 42 of the mold 24. As the head 63 moves downward into the mold cavity, the material 43 is compressed and the excess material is extruded through the passages 66 and 67 into the catch pan 68. To insure that the aforementioned predetermined pressure is not exceeded, the operator of the press observes either the spring 69 or the contact between the nuts 61 and the shoulder 62 through the opening 55. As the operator applies pressure in excess of the predetermined pressure, or as he applies the pressure at such a rate that the excess material is extruded too slowly, the spring 69 will compress further or the nuts 61 will me moved off the shoulder 62. This will notify the operator that he is applying an excessive amount of pressure and he accordingly will decrease the pressure applied to allow the material to be extruded at a satsifactory rate. The downward movement of the plunger 69 is continued at a controlled rate by the operator until the lower face of the annular portion 64 contacts the upper face of the sleeve 38, at which point further travel of the head 63 into the mold cavity 42 is prevented. The compression of the material 43 is now complete and the controlled application of the pressure has resulted in filling the mold cavity with a predetermined volume of compressible material without the rupture or otherwise displacement of the disk 17. The operator now releases the pressure so as to withdraw the head 63 from the mold cavity.

Although the apparatus of Figure 4 is shown provided with two means to indicate the application of excess pressure, it is within the scope of our invention to provide apparatus with one or the other, that is, with the spring 69 or with the nuts 61 and opening 55.

Various modifications of our invention will become apparent, to those skilled in the art, without departing from the scope and spirit of our invention and it is to be understood that the above description and drawings have been set forth to illustrate preferred embodiments of our invention which is not to be unduly limited thereto.

We claim:

Apparatus for consolidating a predetermined volume of compressible material in the cavity of a mold, said mold having an open end and a closed end, the latter end being easily displaceable in preference to the other parts of said mold when the pressure applied to said compressible material exceeds a predetermined pressure, comprising a ram, an anvil at the end of said ram, said anvil having an axial bore therein and provided with an annular shoulder, a plunger adapted to reciprocate in said bore when said predetermined pressure is approached, said plunger having a threaded upper end, a nut threaded on said upper end and normally resting on said shoulder so as to support said plunger in a depending position within said bore, a transverse bore in said anvil whereby the reciprocation of the upper end of said plunger and said nut are observable from the exterior of said anvil, means to reciprocate said ram, said plunger having a head and an intermediate enlarged annular portion, said plunger having a part extending below the extremity of the anvil and exterior of said bore, a compression spring surrounding that part of said plunger which is exterior of said bore, said spring positioned between said annular portion and said anvil, said ram adapted to move said head toward and into said open end of said mold cavity so as to consolidate said compressible material therein, said head having passages therein for extruding the excess compressible material from said mold cavity, and an annular pan attached to said plunger and adapted to receive and hold said excess material, said annular portion adapted to limit the movement of said head into said mold cavity, said spring adapted to compress when said predetermined pressure is approached, and a support member for said mold.

References Cited in the file of this patent

UNITED STATES PATENTS

| | | |
|---|---|---|
| Re. 22,899 | Tucker | July 15, 1947 |
| 713,562 | Frerichs | Nov. 11, 1902 |
| 1,806,300 | Lemming | May 19, 1931 |
| 1,979,156 | Hettel | Oct. 30, 1934 |
| 2,032,869 | Cobb | Mar. 3, 1936 |
| 2,359,152 | Pryor et al. | Sept. 26, 1944 |
| 2,372,833 | Jobst | Apr. 3, 1945 |
| 2,430,033 | Stacy et al. | Nov. 4, 1947 |
| 2,444,502 | Fromer | July 6, 1948 |
| 2,454,285 | Krueger | Nov. 23, 1948 |
| 2,465,799 | Gravesen | Mar. 29, 1949 |
| 2,668,985 | Babbitt | Feb. 16, 1954 |

FOREIGN PATENTS

| | | |
|---|---|---|
| 493,219 | Italy | Apr. 20, 1954 |